(12) United States Patent
Kobayashi et al.

(10) Patent No.: US 7,727,497 B2
(45) Date of Patent: Jun. 1, 2010

(54) METHOD FOR PRODUCING PARTICLES, PARTICLES, AND SINTERED BODY

(75) Inventors: Shintaro Kobayashi, Tokyo (JP); Kazuhiro Yubuta, Tokyo (JP)

(73) Assignees: Hoya Corporation, Tokyo (JP); Nisshin Engineering Inc., Tokyo (JP)

( * ) Notice: Subject to any disclaimer, the term of this patent is extended or adjusted under 35 U.S.C. 154(b) by 412 days.

(21) Appl. No.: 11/463,337

(22) Filed: Aug. 9, 2006

(65) Prior Publication Data

US 2007/0053814 A1 Mar. 8, 2007

(30) Foreign Application Priority Data

Aug. 9, 2005 (JP) ............................ P2005-230320
Sep. 14, 2005 (JP) ............................ P2005-266628

(51) Int. Cl.
*C01F 1/00* (2006.01)
*C05B 19/00* (2006.01)

(52) U.S. Cl. ........................ 423/155; 423/304; 423/323; 423/305; 23/313 R

(58) Field of Classification Search ................. 423/155, 423/304, 308, 311, 305; 23/313 R
See application file for complete search history.

(56) References Cited

U.S. PATENT DOCUMENTS

| | | | | |
|---|---|---|---|---|
| 4,836,994 | A | * | 6/1989 | Inoue et al. .................. 423/308 |
| 5,322,675 | A | * | 6/1994 | Hakamatsuka et al. ....... 423/311 |
| 5,858,318 | A | * | 1/1999 | Luo ............................ 423/308 |
| 6,013,591 | A | | 1/2000 | Ying et al. |
| 6,426,114 | B1 | | 7/2002 | Troczynski et al. |

(Continued)

FOREIGN PATENT DOCUMENTS

FR 2849384 7/2004

(Continued)

OTHER PUBLICATIONS

Bouyer et al. "Suspension Plasma Spraying for Hydroxyapatite Powder Preparation by RF Plasma" IEEE Transactions on Plasma Science, vol. 25, No. 5, Oct. 1997, pp. 1066-1072.

(Continued)

*Primary Examiner*—Stuart Hendrickson
*Assistant Examiner*—Richard M Rump
(74) *Attorney, Agent, or Firm*—Greenblum & Bernstein, P.L.C.

(57) ABSTRACT

Disclosed herein are a particle production method whereby spherical fine particles of a crystalline calcium phosphate-based compound can be efficiently produced at low cost, fine particles (especially, spherical particles) with good flowability produced by the particle production method, and a high-quality sintered body obtained by sintering a molded body of the particles. The particle production method comprises a first step of mixing a first substance containing phosphorus and a second substance containing calcium so that the phosphorus and the calcium are present in a predetermined mole ratio and feeding, into a heated atmosphere, droplets of a slurry containing an amorphous reaction product, obtained by the reaction between the first substance and the second substance, to bring the reaction product into a gaseous state; and a second step of crystallizing the reaction product in the gaseous state to obtain particles mainly composed of a calcium phosphate-based compound containing phosphorus and calcium in the predetermined mole ratio. The heated atmosphere preferably contains plasma produced by ionization of an ambient gas.

15 Claims, 13 Drawing Sheets

U.S. PATENT DOCUMENTS

| | | | |
|---|---|---|---|
| 2003/0138673 A1* | 7/2003 | Sambasivan et al. | 428/702 |
| 2004/0029699 A1 | 2/2004 | Lemaitre et al. | |
| 2004/0076685 A1* | 4/2004 | Tas | 424/602 |
| 2005/0158399 A1* | 7/2005 | Yu et al. | 424/602 |
| 2006/0135340 A1 | 6/2006 | Chang et al. | |

FOREIGN PATENT DOCUMENTS

| | | |
|---|---|---|
| GB | 2132996 | 7/1984 |
| JP | 59-219213 | 12/1984 |
| JP | 3-16906 | 1/1991 |
| JP | 2002-137910 | 5/2002 |
| WO | 00/45867 | 8/2000 |
| WO | 00/46147 | 8/2000 |
| WO | 03/095085 | 11/2003 |
| WO | 2004/011050 | 2/2004 |

OTHER PUBLICATIONS

English language Abstract of JP 3-16906.
English language Abstract of FR 2849384.
English language Abstract of JP 59-219213.
English Language Abstract of JP 2002-137910.
Boyer et al. "Parametric Study of Suspension Plasma Sprayed Hydroxyapatite" in "Thermal Spray: Practical Solutions for Engineering Problems", C. C. Berndt (Ed.), Published by ASM International, Materials Park, Ohio-USA, 1996, pp. 683-690.
Kim et al. "Sol-gel Synthesis and Characterization of Nanostructured Hydroxyapatite Powder" Material Science and Engineering B11, 2004, pp. 232-236.
U.S. Appl. No. 11/541,526 to Kobayashi, filed Oct. 3, 2006 and entitled "Method for Producing Particles, Particles, and Adsorption Apparatus".

* cited by examiner

US 7,727,497 B2

METHOD FOR PRODUCING PARTICLES, PARTICLES, AND SINTERED BODY

BACKGROUND OF THE INVENTION

1. Field of the Invention

The present invention relates to a method for producing particles, particles, and a sintered body.

2. Description of the Prior Art

Calcium phosphate-based compounds are a type of ceramic material, and are widely used as, for example, biomaterials and stationary phase materials for chromatography.

In a case where biomaterials of a calcium phosphate-based compound are produced, particles of a calcium phosphate-based compound are prepared from, for example, a liquid (slurry), the particles are molded into various desired shapes to obtain molded bodies, and the molded bodies are baked (sintered) to obtain sintered bodies. Then, the thus obtained sintered bodies are clinically used as artificial bones and artificial dental roots, and the like.

In a case where stationary phase materials for chromatography of a calcium phosphate-based compound are produced, particles of a calcium phosphate-based compound are prepared in the same manner as in the case of production of the biomaterials described above, and then the particles are baked (sintered) to obtain sintered fine particles. The thus obtained sintered fine particles are used as column packing materials and the like.

As a method for preparing such particles, a method for producing hydroxyapatite particles using an emulsion technique has been disclosed (see, for example, Japanese Patent Laid-open No. 2002-137910).

However, such a method necessarily involves complicated treatment such as decantation or centrifugation and is not suitable for mass production, and therefore has problems in production efficiency and cost.

In addition, there is also a problem that particles obtained by this method are likely to be amorphous. Therefore, in a case where molded bodies are prepared using such particles, these molded bodies are likely to vary in density, and sintered bodies obtained by sintering the molded bodies are lacking in stability of strength and porosity.

SUMMARY OF THE INVENTION

It is therefore an object of the present invention to provide a method for producing particles whereby fine particles (especially, spherical particles) of a crystalline calcium phosphate-based compound can be efficiently produced at low cost, fine particles (especially, spherical particles) with good flowability which are produced by the particle production method, and a high-quality sintered body obtained by sintering a molded body of the particles.

In order to achieve the above object, a first aspect of the present invention is directed to a method for producing particles, comprising a first step of mixing a first substance containing phosphorus and a second substance containing calcium and feeding, into a heated atmosphere, droplets of a liquid containing an amorphous reaction product, obtained by the reaction between the first substance and the second substance, to bring the reaction product into a gaseous state; and a second step of crystallizing the reaction product in the gaseous state to obtain particles mainly composed of a calcium phosphate-based compound.

According to the first aspect of the present invention, it is possible to efficiently produce fine particles (especially, spherical particles) of a crystalline calcium phosphate-based compound at low cost.

In the method of the present invention, it is preferred that the first substance contains as a main ingredient, at least either phosphorus oxide or phosphoric acid ester.

Such a first substance can easily react with the second substance in a solvent so that an amorphous reaction product is more efficiently produced.

Further, in the method of the present invention, it is also preferred that the second substance contains as a main ingredient, at least either calcium alkoxide or calcium salt.

Such a second substance can easily react with the first substance in a solvent so that an amorphous reaction product is more efficiently produced.

Moreover, in the method of the present invention, it is also preferred that the amount of impurities contained in the calcium phosphate-based compound is 5 wt % or less.

This allows the particles mainly composed of the calcium phosphate-based compound to have excellent properties (especially, high strength).

In this case, it is preferred that the impurities mainly contain at least either a by-product other than the reaction product or a decomposition product of the calcium phosphate-based compound.

By reducing the amount of such impurities contained in the calcium phosphate-based compound, it is possible to obtain particles having especially high strength.

Moreover, in the method of the present invention, it is also preferred that the heated atmosphere contains plasma produced by ionization of an ambient gas.

The plasma can more evenly apply very high energy to the droplets containing the amorphous reaction product so that the droplets are heated efficiently and evenly.

Moreover, in the method of the present invention, it is also preferred that the temperature of the plasma is in the range of 2,000 to 15,000° C.

By setting the temperature of the plasma to a value within the above range, it is possible to rapidly vaporize the droplets so that the reaction product is brought into a mixture in a gaseous state. Further, by rapidly cooling the mixture in a gaseous state, it is possible to efficiently obtain fine particles.

Moreover, in the method of the present invention, it is also preferred that the second step further comprises the step of forcibly cooling the reaction product in the gaseous state.

By forcibly cooling the reaction product in the gaseous state, it is possible to efficiently carry out cooling and crystallization of the reaction product in the gaseous state in a short period of time, thereby enabling a larger amount of the liquid (slurry) containing the amorphous reaction product to be treated per unit time. As a result, the yield of particles is improved, and therefore the production cost of particles is reduced.

Moreover, in the method of the present invention, it is also preferred that the particles are substantially spherical in shape.

This improves the flowability of the particles, thereby improving the filling properties of the particles during molding and the density of a molded body of the particles.

In this case, the average particle diameter of the spherical particles is preferably in the range of 5 to 150 nm.

By setting the average particle diameter of the spherical particles to a value within the above range, it is possible to particularly improve the filling properties of the particles, thereby particularly improving the density of a molded body of the particles and the density of a sintered body obtained by sintering the molded body.

Moreover, in the method of the present invention, it is also preferred that the calcium phosphate-based compound is hydroxyapatite or tricalcium phosphate.

From the viewpoint of a stoichiometric ratio, hydroxyapatite or tricalcium phosphate is a material from which stable crystalline particles can be easily formed.

A second aspect of the present invention is directed to particles produced by the particle production method according to the first aspect of the present invention.

According to the second aspect of the present invention, it is possible to obtain fine particles (especially, spherical particles) with good flowability.

A third aspect of the present invention is directed to particles mainly composed of a crystalline calcium phosphate-based compound, which have an average particle diameter of 5 to 300 nm and an average roundness coefficient C represented by the following formula (I) of 0.8 to 0.99:

$$C = 4\pi S/L^2 \qquad (I)$$

where S (nm$^2$) represents an area of a projection image of a particle as a measuring object, and L (nm) represents a circumferential length of the projection image of the particle as a measuring object.

According to the third aspect of the present invention, it is possible to obtain particles which can be used as, for example, carriers capable of efficiently adsorbing (capturing) objects to be captured.

The particles according to the second or third aspect of the present invention preferably contain hollow particles in the proportion of 5 to 40%.

This makes it possible to use the particles of the present invention for a system (drug delivery system) for releasing a drug or the like in a target organ. For example, a drug or the like is introduced into hollow portions of the hollow particles to allow the hollow particles to deliver the drug to a target organ. After the hollow particles containing the drug reach the target organ, the drug is released in the target organ.

A fourth aspect of the present invention is directed to a sintered body obtained by sintering a molded body of the particles according to the second or third aspect of the present invention.

According to the fourth aspect of the present invention, it is possible to obtain a high-quality sintered body having excellent dimensional accuracy and high strength.

BEST MODE FOR CARRYING OUT THE INVENTION

Figure 1:
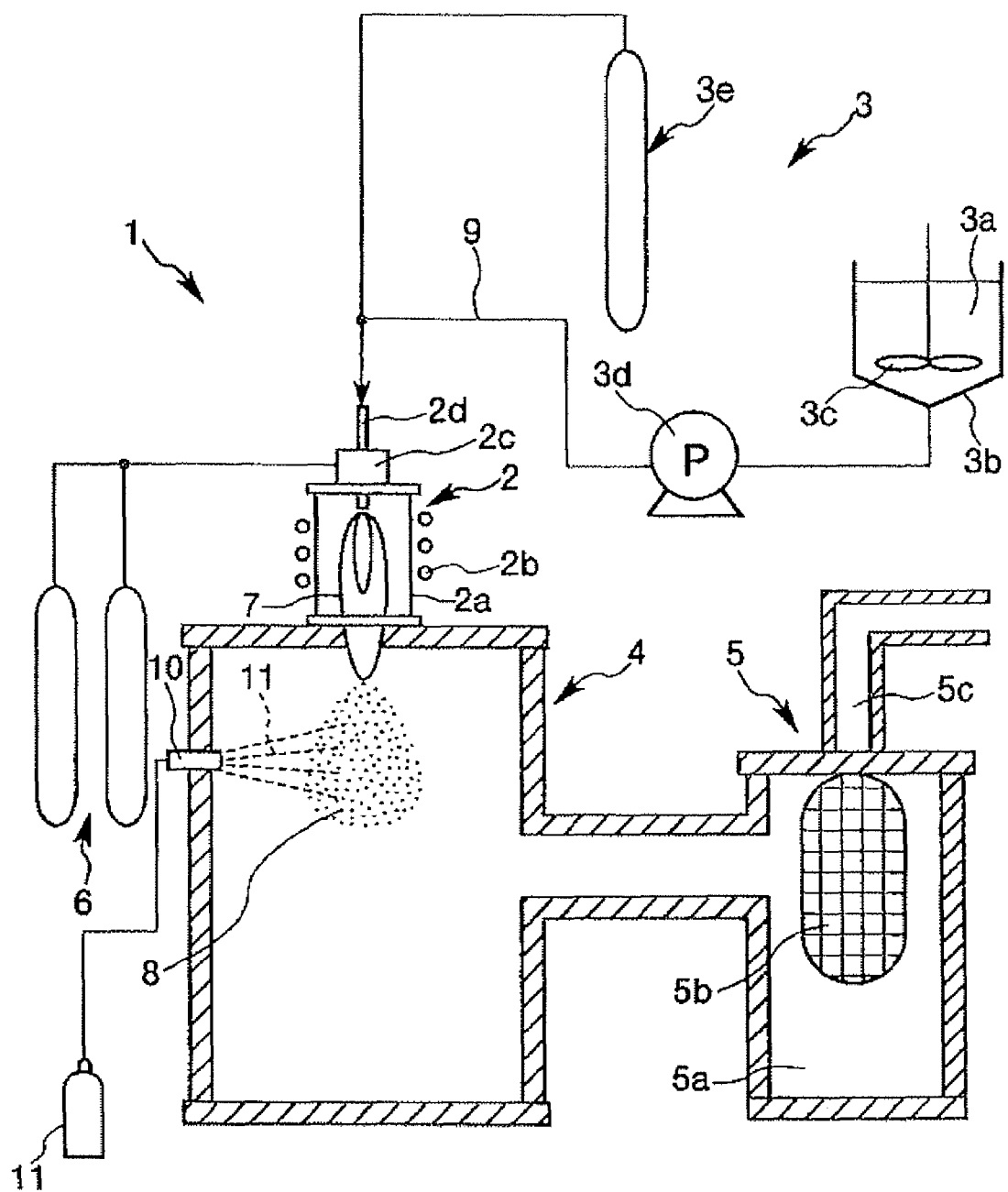
FIG. 1 shows a (cross-sectional) schematic view of thermal plasma (fine particle production) equipment.

Hereinbelow, a method for producing particles, particles, and a sintered body according to the present invention will be described in detail with reference to preferred embodiments shown in the accompanying drawing.

The particle production method of the present invention comprises a first step of mixing a first substance containing phosphorus and a second substance containing calcium so that the phosphorus and the calcium are present in a predetermined mole ratio and feeding, into a heated atmosphere, droplets of a slurry (gelled liquid) containing an amorphous reaction product, obtained by the reaction between the first substance and the second substance, to bring the reaction product into a gaseous state; and a second step of crystallizing the reaction product in the gaseous state to obtain particles mainly composed of a (crystalline) calcium phosphate-based compound containing phosphorus and calcium in the predetermined mole ratio. The first and second steps will be described below.

(First Step)

First, a mixed liquid (sol liquid) is obtained by, for example, mixing a first substance containing phosphorus and a second substance containing calcium with a solvent so that the phosphorus and the calcium are present in a predetermined mole ratio. In the mixed liquid, the first substance and the second substance are reacted to produce an amorphous reaction product. In this way, a slurry (gelled liquid) containing the reaction product is obtained.

Preferred examples of the first substance include substances each containing as a main ingredient, at least either phosphorus oxide or phosphoric acid ester. Such a substance can easily react with the second substance in the solvent so that an amorphous reaction product is more efficiently produced.

Specific examples of the phosphorus oxide include phosphorus suboxide, diphosphorus trioxide, diphosphorus tetroxide, and diphosphorus pentoxide. A specific example of the phosphoric acid ester includes triethyl phosphate.

On the other hand, preferred examples of the second substance include, but are not limited to, substances each containing, as a main ingredient, at least either calcium alkoxide or calcium salt. Such a substance can easily react with the first substance in the solvent so that an amorphous reaction product is more efficiently produced.

Specific examples of the calcium alkoxide include calcium methoxide and calcium ethoxide. Specific examples of the calcium salt include calcium carbonate, calcium chloride, calcium nitrate, calcium acetate, calcium lactate, and hydrates thereof.

Examples of the solvent include mixtures each obtained by mixing as a main ingredient, an alcohol such as methanol, ethanol, propanol, or butanol and an appropriate amount (small amount) of water such as distilled water, pure water, ultra pure water, ion exchange water, or RO water.

In this case, the alcohol content in the mixture is preferably 70 vol % or higher, more preferably 90 vol % or higher. By setting the alcohol content in the mixture to a value within the above range, it is possible to more efficiently carry out the reaction between the first substance and the second substance with reliability.

The temperature of the reaction between the first substance and the second substance is not particularly limited, but is preferably in the range of about 0 to 50° C., more preferably in the range of about 10 to 40° C.

The time of the reaction between the first substance and the second substance is not also particularly limited, but is preferably in the range of about 10 minutes to 5 hours, more preferably in the range of about 20 minutes to 2 hours.

During the reaction between the first substance and the second substance, the mixed liquid may be stirred, vibrated, or sonicated.

It is to be noted that the mixed liquid containing the first substance and the second substance may be prepared by, for example, adding a solvent to a mixture of the first substance and the second substance, or mixing a solution obtained by dissolving the first substance in a solvent and a solution obtained by dissolving the second substance in a solvent.

Here, the mixing ratio between the first substance and the second substance is appropriately set according to a desired mole ratio (Ca/P ratio) between phosphorus and calcium of a target calcium phosphate-based compound.

More specifically, the Ca/P ratio is preferably in the range of about 1 to 2, more preferably in the range of about 1.3 to 1.7. By mixing the first substance and the second substance so that the Ca/P ratio lies within the above range, it is possible to easily crystalline calcium and phosphorus in the second step described later.

Next, the thus obtained slurry is fed (sprayed) in the form of droplets into a heated atmosphere. By doing so, it is possible to form fine droplets of the slurry and to heat the droplets in a heated atmosphere.

By heating the droplets in a heated atmosphere, it is possible to volatilize the solvent contained in the droplets and to vaporize the reaction product to bring it into a gaseous state.

Further, by heating the reaction product in the gaseous state, it is possible to facilitate the change of bonding between atoms in the reaction product, thereby bringing the reaction product into a more stable atomic state (crystalline state).

The heated atmosphere is not particularly limited, but preferably contains plasma produced by ionization of an ambient gas. The plasma can more evenly apply very high energy to the droplets containing the amorphous reaction product so that the droplets are heated efficiently and evenly.

As a result, the droplets efficiently vaporize so that the reaction product is brought into a mixture in a gaseous state. By rapidly cooling the mixture in a gaseous state, it is possible to reliably obtain particles having a small particle diameter. It is to be noted that the mixture in a gaseous state contains the reaction product in a gaseous state and the (volatilized) solvent in a gaseous state.

From the reason described above, among various fine particle production methods, a thermal plasma method is particularly preferably used for drying the slurry, vaporizing the reaction product, and producing particles (granulating the reaction product).

Examples of a method for turning a gas into plasma include, but are not limited to, various methods such as electric discharge (e.g., high-frequency induction thermal plasma, arc discharge, glow discharge), light irradiation (e.g., laser light irradiation, lamp light irradiation), and application of heat (e.g., application of chemical reaction heat).

A high-frequency induction thermal plasma method is a method for producing plasma by ionizing an ambient gas by increasing the temperature of the ambient gas through electromagnetic induction using a coil conducting a high frequency current.

Arc discharge or glow discharge is a method for producing plasma by using heat generated by direct-current discharge in a reduced-pressure atmosphere. The pressure of the reduced-pressure atmosphere is preferably in the range of about 1 to 1,500 Pa, more preferably in the range of about 1.3 to 1,300 Pa.

Examples of laser light to be used for laser light irradiation include: gas lasers such as helium-neon laser, argon ion laser, carbon dioxide gas laser, excimer laser, and nitrogen laser; solid lasers such as ruby laser, YAG (Yttrium Aluminum Garnet) laser, glass laser, and neodymium laser; metal lasers such as helium-cadmium laser, copper vapor laser, and gold vapor laser; and semiconductor lasers.

Examples of a lamp to be used for lamp light irradiation include; discharge lamps such as flash lamps, xenon lamps, and metal halide lamps; and heating lamps such as halogen lamps and tungsten lamps.

An example of heat generated by chemical reaction includes heat generated by combustion or explosion of gunpowder.

Among these various methods for producing plasma, electric discharge methods are preferably used. Particularly, a high-frequency induction thermal plasma method is preferably used. By using an electric discharge method (especially, a high-frequency induction thermal plasma method), it is possible to more efficiently turn an ambient gas into plasma and to easily set the temperature of an atmosphere to a high value, thereby enabling particles to be easily and reliably produced at low cost.

In addition, a high-frequency induction thermal plasma method can produce plasma with little unevenness in a relatively large space, which is advantageous in that particles with small variations in shape and particle diameter can be produced.

The temperature of plasma is preferably in the range of about 2,000 to 15,000° C., more preferably in the range of about 7,000 to 15,000° C., even more preferably in the range of about 10,000 to 15,000° C. By setting the temperature of plasma to a value within the above range, it is possible to rapidly dry the droplets of the slurry and to vaporize the reaction product to bring it into a mixture in a gaseous state. Further, by rapidly cooling the mixture in a gaseous state, it is possible to efficiently obtain particles having a smaller particle diameter.

In addition, by setting the temperature of plasma to a value within the above range, it is also possible to more efficiently crystallize the amorphous reaction product (that is, it is possible to more efficiently change the amorphous reaction product to a crystalline calcium phosphate-based compound). It is to be noted that even if the temperature of plasma exceeds the above upper limit value, there is no problem in producing a calcium phosphate-based compound. However, production of plasma having a temperature exceeding the above upper limit value requires an expensive apparatus and a large amount of electrical power, which results in undesirable increase in production cost.

It is to be noted that the phrase "temperature of plasma" does not refer to an actual temperature of an atmosphere but refers to a theoretical temperature determined by converting the kinetic energy of plasma into a temperature value.

(Second Step)

Next, the amorphous reaction product is crystallized by rapidly cooling the mixture in a gaseous state. By doing so, it is possible to obtain fine particles mainly composed of a crystalline calcium phosphate-based compound containing phosphorus and calcium in a Ca/P ratio predetermined when the first substance and the second substance are mixed together in the first step. That is, it is possible to obtain fine particles of a crystalline calcium phosphate-based compound reflecting a Ca/P ratio predetermined when a raw material of a calcium phosphate-based compound is prepared in the first step.

An example of a method for crystallizing the amorphous reaction product includes a method in which the reaction product heated in the first step to facilitate the change of bonding between atoms is left standing after the termination of heating. By terminating heating of the reaction product, it is possible to selectively bring bonding between atoms in the reaction product into amore stable state, thereby enabling a crystalline calcium phosphate-based compound to be obtained.

In the present invention, the amorphous reaction product is uniformly crystallized (that is, the amorphous reaction product is uniformly changed to a crystalline calcium phosphate-based compound) so that the occurrence of variations in crystal growth rate is suppressed, thereby enabling the production of crystal grains substantially uniform in grain size. As a result, particles having high density and high strength are obtained.

In the second step, it is preferred that the mixture in a gaseous state is forcibly cooled. By forcibly cooling the mixture in a gaseous state, it is possible to efficiently carry out cooling and crystallization of the reaction product in a short period of time, thereby enabling a larger amount of the liquid (slurry) to be treated per unit time. As a result, the yield of particles is improved, and therefore the producing cost of particles is reduced.

Further, according to the particle production method described above, droplets of the amorphous reaction product generated from the mixture in a gaseous state are rapidly cooled, and therefore the surface tension of the droplets is increased when the amorphous reaction product is changed to a crystalline calcium phosphate-based compound. This promotes spheroidization of the droplets, thereby enabling particles having a substantially spherical shape to be obtained. That is, the particle production method of the present invention can be suitably used for producing fine particles nearly spherical in shape.

The thus obtained particles mainly composed of a calcium phosphate-based compound preferably has an average particle diameter of about 5 to 300 nm and an average roundness coefficient C represented by the following formula (I) of about 0.8 to 0.99:

$$C = 4\pi S/L^2 \quad (I)$$

wherein S (nm$^2$) represents an area of a projection image of a particle as a measuring object, and L (nm) represents a circumferential length of the projection image of the particle as a measuring object.

It is to be noted that when a projection image of a particle as a measuring object is a perfect circle, the roundness coefficient C of the particle is the maximum, 1. That is, a roundness coefficient C closer to the maximum, 1 means that a particle is closer to a perfect sphere.

The particles having an average particle diameter within the above range and an average roundness coefficient C within the above range are relatively fine and have a spherical shape close to a perfect sphere, and therefore can exhibit excellent dispersibility in, for example, a dispersion medium. For example, such particles can be uniformly dispersed in a liquid sample containing objects to be captured, such as proteins, nucleic acids, or cells, and therefore can be used as, for example, carriers capable of efficiently adsorbing (capturing) objects to be captured.

As described above, the average roundness coefficient C of the particles is preferably in the range of about 0.8 to 0.99, but is more preferably in the range of about 0.85 to 0.99.

Since the particles with an average roundness coefficient C within the above range have a spherical shape close to a perfect sphere, the flowability of the particles is improved, thereby improving the filling properties of the particles during molding and the density of a molded body of the particles. Such particles can be used as a raw material for preparing a compact molded body having high strength. Further, by sintering the molded body, it is possible to obtain a sintered body having excellent dimensional accuracy and high strength.

Further, as described above, the average particle diameter of the particles is preferably in the range of about 5 to 300 nm, but is more preferably in the range of about 5 to 150 nm, even more preferably in the range of about 10 to 100 nm. The particle production method of the present invention can be suitably used for producing such fine particles.

By setting the average particle diameter to a value within the above range, it is possible to particularly improve the filling properties of the particles, thereby particularly improving the density of a molded body of the particles and the density of a sintered body obtained by sintering the molded body.

When the particles having an average particle diameter within the above range are used as a stationary phase material for columns (that is, as a column packing material), the amount of the material to be filled in a column and the contact area of the particles with a sample are increased, and therefore it is possible to treat the sample with higher accuracy.

Further, according to the present invention, particles are produced by crystal growth of a crystalline calcium phosphate-based compound obtained by crystallizing the amorphous reaction product, and therefore the thus obtained particles are mainly composed of a high-purity calcium phosphate-based compound.

More specifically, the amount of impurities contained in the particles produced by the particle production method of the present invention is preferably 5 wt % or less, more preferably 3 wt % or less. This allows the particles mainly composed of a calcium phosphate-based compound to have excellent properties (especially, high strength). The particle production method of the present invention can produce particles of such a very high-purity calcium phosphate-based compound easily and reliably.

Here, examples of such impurities include a by-product other than the reaction product in the slurry, such as CaO, and a calcium phosphate-based compound having a Ca/P ratio different from a target Ca/P ratio (secondary reaction product). By reducing the amount of these impurities, it is possible to obtain particles having particularly high strength.

As described above, the Ca/P ratio of the calcium phosphate-based compound produced in such a manner as described above is preferably in the range of about 1 to 2, more preferably in the range of about 1.3 to 1.7.

Among various calcium phosphate-based compounds having a Ca/P ratio within the above range, hydroxyapatite (Ca/P ratio: 1.67) or tricalcium phosphate (Ca/P ratio: 1.5) is preferred. From the viewpoint of a stoichiometric ratio, hydroxyapatite or tricalcium phosphate is a material from which stable crystalline particles can be easily formed.

In addition, hydroxyapatite or tricalcium phosphate is similar to the inorganic part of human bone in composition and structure, and therefore has high biocompatibility. For this reason, particles composed of hydroxyapatite or tricalcium phosphate have high biocompatibility with components derived from a living body, and therefore can be suitably used as biomaterials such as artificial bones and bone filling materials and as stationary phase materials for chromatography.

Further, such particles preferably contain hollow particles in the proportion of about 5 to 40%, more preferably about 10 to 30%. This makes it possible to use the particles of the present invention for a system (drug delivery system) for releasing a drug or the like in a target organ. For example, a drug or the like is introduced into hollow portions of the hollow particles to allow the hollow particles to deliver the drug to a target organ. After the hollow particles containing the drug reach the target organ, the drug is released in the target organ.

The particle production method of the present invention described above is preferably carried out using, for example, equipment shown in FIG. 1.

FIG. 1 shows a (cross-sectional) schematic view of thermal plasma equipment which can produce spherical fine particles of a crystalline calcium phosphate-based compound by the use of plasma produced by a high-frequency induction thermal plasma method. It is to be noted that in the following description, the upper side and the lower side in FIG. 1 will be referred to as "upper side" and "lower side", respectively. Further, in FIG. 1, some components are omitted to simplify the illustration.

Equipment for producing spherical fine particles of a calcium phosphate-based compound (thermal plasma equipment) 1 comprises a plasma torch 2 for producing thermal plasma, a raw material feeding device 3 for feeding a raw material into the plasma torch 2, a chamber 4 for producing spherical fine particles of a calcium phosphate-based compound 8, and a collection section 5 for collecting the spherical fine particles of a calcium phosphate-based compound 8 produced in the chamber 4.

The plasma torch 2 includes a quartz tube 2a and a coil for high-frequency oscillation 2b surrounding the outside of the quartz tube 2a. On the top of the plasma torch 2, there is provided, at the center of the plasma torch 2, an introduction tube 2d for introducing a raw material and an atomizing gas (carrier gas) into the plasma torch 2. A plasma gas (ambient gas) is fed through a plasma gas inlet 2c into the plasma torch 2 in the vertical direction along an inner tube of the quartz tube 2a.

The plasma gas is fed from a plasma gas supply source 6 into the plasma gas inlet 2c. Examples of the plasma gas include argon, nitrogen, oxygen, and mixtures thereof. In the plasma gas supply source 6, for example, two different plasma gases are prepared As described above, the plasma gas is fed through the plasma gas inlet 2c into the plasma torch 2 in the vertical direction along an inner tube of the quartz tube 2a. Then, a high-frequency electric current is applied to the coil for high-frequency oscillation 2b so that plasma flame 7 is produced.

It is to be noted that the outside of the quartz tube 2a is covered with a tube (not shown in the drawing) provided concentrically with the quartz tube 2a. In the space created between this tube and the quartz tube 2a, cooling water (not shown in the drawing) is circulated to water-cool the quartz tube 2a to prevent the quartz tube 2a from reaching a too high temperature due to the plasma flame 7 produced in the plasma torch 2.

The raw material feeding device 3 feeds a raw material, that is, a slurry 3a containing an amorphous reaction product into the plasma torch 2. The raw material feeding device 3 is connected through a tube 9 to the introduction tube 2d provided on the top of the plasma torch 2. The word "slurry" means a liquid-solid mixture in which fine solid particles are blended in a liquid.

The raw material feeding device 3 includes a container 3b for holding the slurry 3a, a stirrer 3c for stirring the slurry 3a in the container 3b, a pump 3d for applying pressure to the slurry 3a to feed the slurry 3a through the introduction tube 2d into the plasma torch 2, and an atomizing gas supply source 3e. An atomizing gas is supplied by the atomizing gas supply source 3e, and is fed together with the slurry 3a through the introduction tube 2d into the plasma torch 2. In this way, the slurry 3a is atomized in the plasma torch 2. That is, the slurry 3a is divided into droplets. Examples of the atomizing gas include argon, nitrogen, hydrogen, oxygen, and air.

On the other hand, in the chamber 4 provided adjacent to the lower end of the plasma torch 2, spherical fine particles of a calcium phosphate-based compound 8 are produced. More specifically, the slurry fed from the raw material feeding device 3 and atomized (divided into droplets) in the plasma torch 2 is reacted in the plasma flame 7, and is then vaporized into a mixture in a gaseous state. Then, the mixture in a gaseous state is rapidly cooled in the chamber 4 so that spherical fine particles of a calcium phosphate-based compound 8 are produced.

In the upper part of the chamber 4, there is provided a cooling means 10.

Examples of a method for cooling the mixture in a gaseous state by the cooling means 10 include, but are not limited to: bringing the mixture in a gaseous state into contact with a cooling gas 11 (see FIG. 1); and cooling a gas contained in the chamber 4.

Examples of the cooling gas 11 include: oxidizing gases such as air and oxygen; inert gases such as nitrogen, helium, neon, and argon; and reducing gases such as hydrogen and carbon monoxide. Among these gases, inert gases are preferably used. By using such an inert gas as a cooling gas 11, it is possible to prevent a produced calcium phosphate-based compound from being degenerated due to oxidation or reduction.

On the other hand, a gas contained in the chamber 4 can be cooled by, for example, cooling the chamber 4 with a refrigerant or the like. In this case, a gas contained in the chamber 4 is cooled by heat transmission.

It is to be noted that the cooling means 10 is optional and may be omitted.

The collection section 5 for collecting the produced spherical fine particles of a calcium phosphate-based compound 8 is provided by the side of the lower part of the chamber 4. The collection section 5 includes a collection chamber 5a, a filter 5b provided in the collection chamber 5a, and a vacuum pump (not shown in the drawing) connected with the collection chamber 5a through a tube 5c extending from the top of the collection chamber 5a. The produced fine particles are drawn into the collection chamber 5a by the vacuum pump (not shown in the drawing), and are then retained and collected on the surface of the filter 5b.

The particles produced by the particle production method of the present invention can be used not only as the above-mentioned biomaterials such as artificial bones and bone filling materials and the above-mentioned stationary phase materials for chromatography but also as adsorbents for healthcare products such as virus adsorption masks, air fresheners, and antibacterial soaps.

A sintered body to be used as a biomaterial can be produced by, for example, the following method.

First, particles of a crystalline calcium phosphate-based compound are prepared in such a manner as described above.

Then, these particles of a crystalline calcium phosphate-based compound are molded into a desired shape to obtain a molded body.

Such a molded body can be produced by, for example, any one of the following various methods I to V: I) charging a slurry containing particles of a calcium phosphate-based compound into a desired mold; II) unevenly distributing the solid matter of the slurry by precipitating or centrifuging the slurry; III) charging the slurry into a desired mold and dehydrating the slurry to leave solid matter in the mold; IV) compression molding; and V) mixing particles of a calcium phosphate-based compound and watery glue, charging the mixture into a mold, and drying the mixture.

The thus obtained molded body is naturally or artificially dried. In the case of artificial drying, the molded body is dried by, for example, hot-air drying, freeze drying, or vacuum drying.

Further, the molded body may be subjected to machining such as cutting, grinding, and polishing.

Next, the dried molded body is sintered in, for example, a furnace to obtain a sintered body.

The temperature for sintering is not particularly limited as long as a calcium phosphate-based compound can be sintered, but is preferably in the range of about 700 to 1,300° C., more preferably in the range of about 900 to 1,250° C.

The time for sintering slightly varies depending on the sintering temperature etc., but is not particularly limited. However, the sintering time is preferably in the range of about 0.1 to 10 hours, more preferably in the range of about 1 to 5 hours.

Examples of a sintering atmosphere include, but are not limited to, oxidizing atmospheres such as air and oxygen, inert atmospheres such as nitrogen, helium, neon, and argon, reducing atmospheres such as hydrogen and carbon monoxide, and reduced-pressure atmospheres.

It is to be noted that sintering may be repeated more than once, if necessary.

In this way, a sintered body is obtained.

The method for producing particles, the particles, and the sintered body of the present invention have been described with reference to the embodiments shown in the drawing, but the present invention is not limited thereto.

For example, the particle production method of the present invention may further comprise an additional step for any purpose, if necessary.

EXAMPLES

Actual examples of the present invention will be described below.

1. Production of Fine Particles

Example 1

<1> First, 0.18 mol of diphosphorus pentoxide (first substance) and 0.6 mol of calcium nitrate tetrahydrate (second substance) were added to 900 mL of a 95 vol % aqueous ethanol solution (solvent) so that a Ca/P ratio was 1.67, and then the resultant mixture was stirred at room temperature (25° C.) for 4 hours to gelate the mixture. In this way, a slurry containing a reaction product was obtained.

Then, the aqueous ethanol solution was removed from the slurry, and the remaining reaction product was subjected to X-ray diffraction (XRD) analysis to analyze the crystal structure thereof. The result of analysis (X-ray diffraction spectrum) is shown in FIG. 2.

Figure 2:
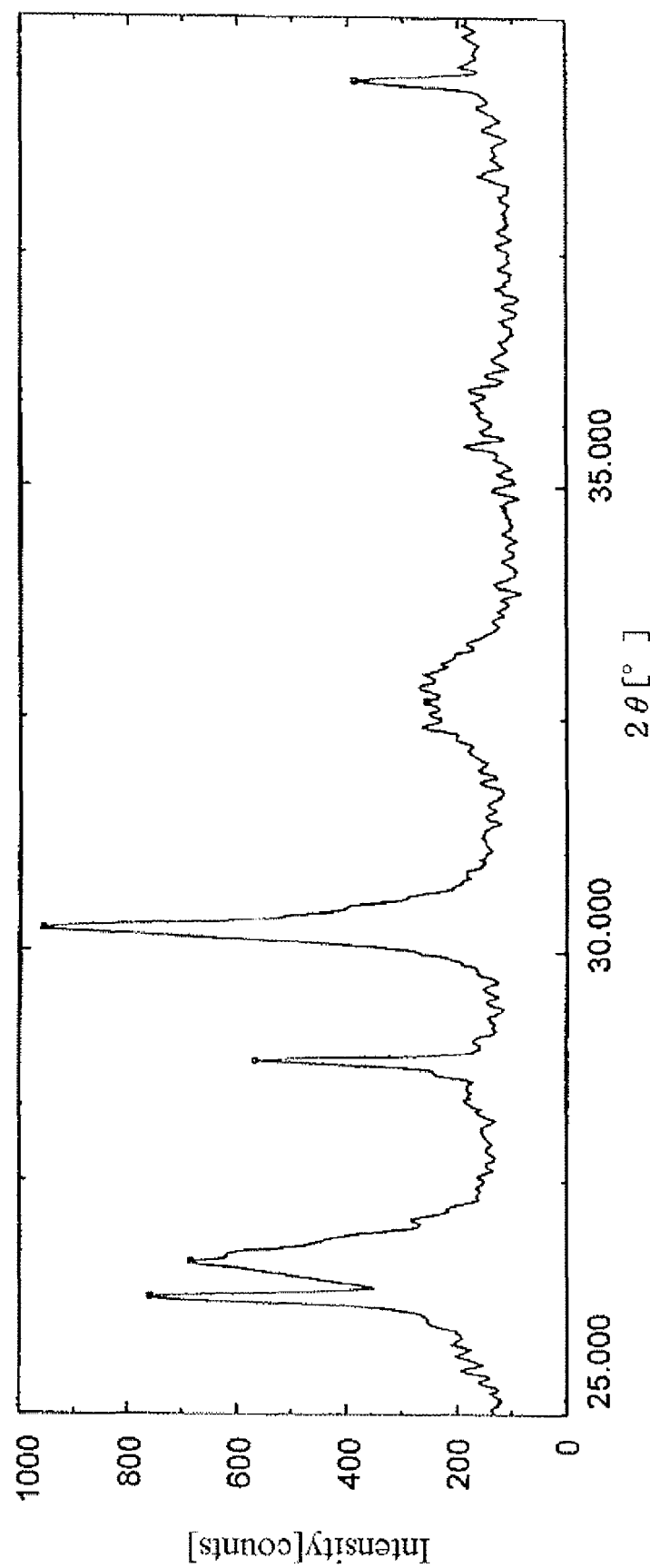
FIG. 2 shows an X-ray diffraction spectrum of a reaction product contained in a slurry prepared in Example 1.

As can be seen from FIG. 2, some peaks are observed in the X-ray diffraction spectrum of the reaction product but the spectrum is wholly broad. From the result, it can be considered that the reaction product is predominantly amorphous.

<2> Next, the slurry obtained in <1> was atomized into the plasma flame 7 produced in the thermal plasma (fine particle production) equipment 1 shown in FIG. 1 to obtain spherical fine particles. It is to be noted that a cooling gas was air.

The operating conditions of the thermal plasma (fine particle production) equipment 1 are shown below.
Frequency of high-frequency electric current: 4 MHz
Output of high-frequency electric current: 70 kW
Plasma temperature: 10,000° C.
Type of gas for producing plasma: argon+oxygen Example 2

Fine particles were produced in the same manner as in the Example 1 except that calcium ethoxide (0.6 mol) was used as the second substance instead of calcium nitrate tetrahydrate.

Example 3

Fine particles were produced in the same manner as in the Example 1 except that a mixture of calcium nitrate tetrahydrate (0.3 mol) and calcium ethoxide (0.3 mol) was used as the second substance instead of calcium nitrate tetrahydrate.

Example 4

Fine particles were produced in the same manner as in the Example 1 except that triethyl phosphate (0.36 mol) was used as the first substance instead of diphosphorus pentoxide.

Example 5

Fine particles were produced in the same manner as in the Example 1 except that a mixture of diphosphorus pentoxide (0.09 mol) and triethyl phosphate (0.18 mol) was used as the first substance instead of diphosphorus pentoxide.

Example 6

Fine particles were produced in the same manner as in the Example 1 except that the slurry was atomized not into the plasma flame but into an atmosphere heated by an electric heater. It is to be noted that the heating temperature was 1,800° C.

Example 7

Fine particles were produced in the same manner as in the Example 1 except that the amount of the second substance (calcium nitrate tetrahydrate) was changed to 0.36 mol so that a Ca/P ratio was 1.0.

Example 8

Fine particles were produced in the same manner as in the Example 1 except that the amount of the second substance (calcium nitrate tetrahydrate) was changed to 0.43 mol so that a Ca/P ratio was 1.2.

Example 9

Fine particles were produced in the same manner as in the Example 1 except that the amount of the second substance (calcium nitrate tetrahydrate) was changed to 0.50 mol so that a Ca/P ratio was 1.4.

Example 10

Fine particles were produced in the same manner as in the Example 1 except that the amount of the second substance (calcium nitrate tetrahydrate) was changed to 0.54 mol so that a Ca/P ratio was 1.5.

Comparative Example 1

<1> First in accordance with a conventional wet synthesis method, calcium hydroxide was reacted with phosphoric acid to produce hydroxyapatite particles (Ca/P ratio: 1.67). Then, the hydroxyapatite particles were added to 900 mL of a 95 vol % aqueous ethanol solution, and the resultant mixture was stirred to obtain a slurry.

The crystal structure of the hydroxyapatite particles was analyzed by X-ray diffraction analysis. The result of analysis (X-ray diffraction spectrum) is shown in FIG. 3.

Figure 3:
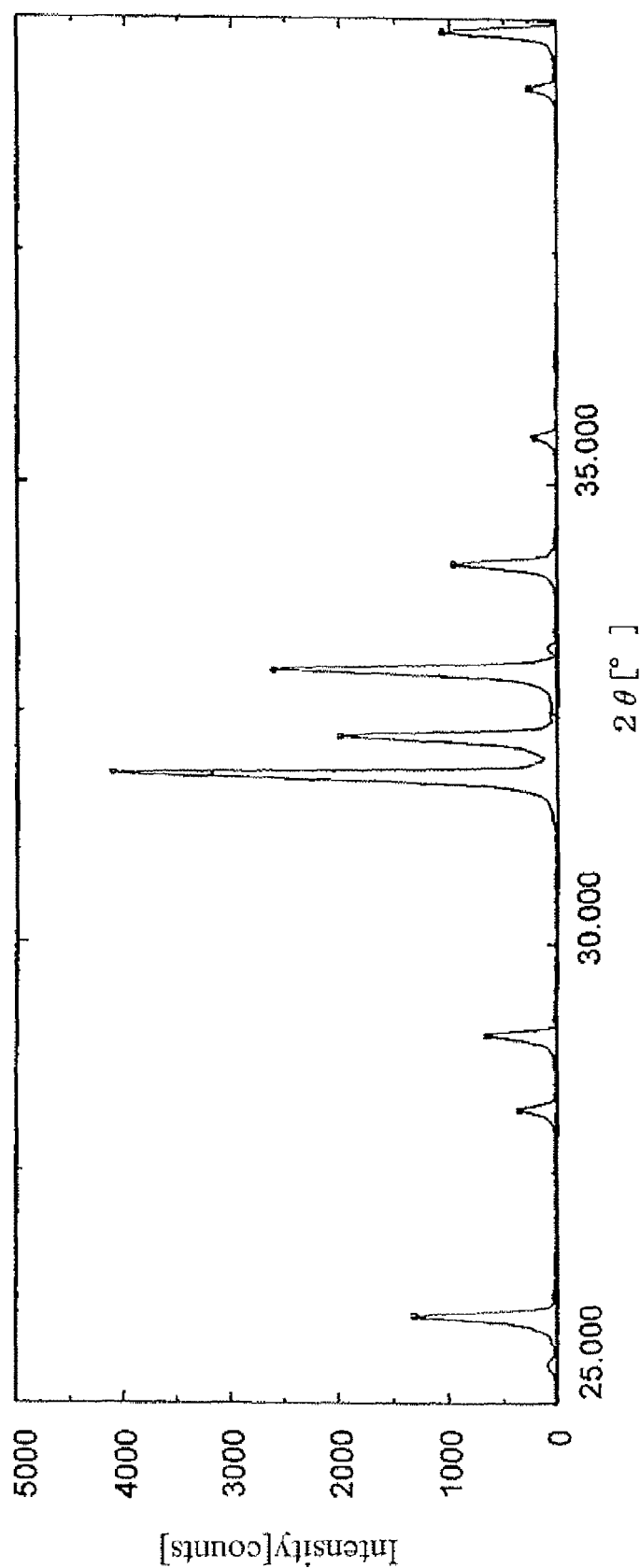
FIG. 3 shows an X-ray diffraction spectrum of hydroxyapatite particles contained in a slurry prepared in Comparative Example 1.

As can be seen from FIG. 3, sharp peaks attributed to the crystal structure of hydroxyapatite are observed in the X-ray diffraction spectrum of the hydroxyapatite particles.

<2> Next, the slurry obtained in <1> was atomized into the plasma flame 7 produced in the thermal plasma (fine particle production) equipment 1 shown in FIG. 1 in the same manner as in the Example 1 to obtain fine particles.

Comparative Example 2

Fine particles were produced in the same manner as in the Comparative Example 1 except that the slurry was atomized not into the plasma flame but into an atmosphere heated by an electric heater.

2. Evaluations

2.1 Evaluation of Particle Diameter

The average particle diameter of the fine particles produced in each of the Examples and the Comparative Examples was determined.

The average particle diameter was calculated as the average of particle diameters of 10 fine particles determined from a transmission electron microscope (TEN) image of the fine particles.

The evaluation result of average particle diameter is shown in Table 1.

Figure 4:
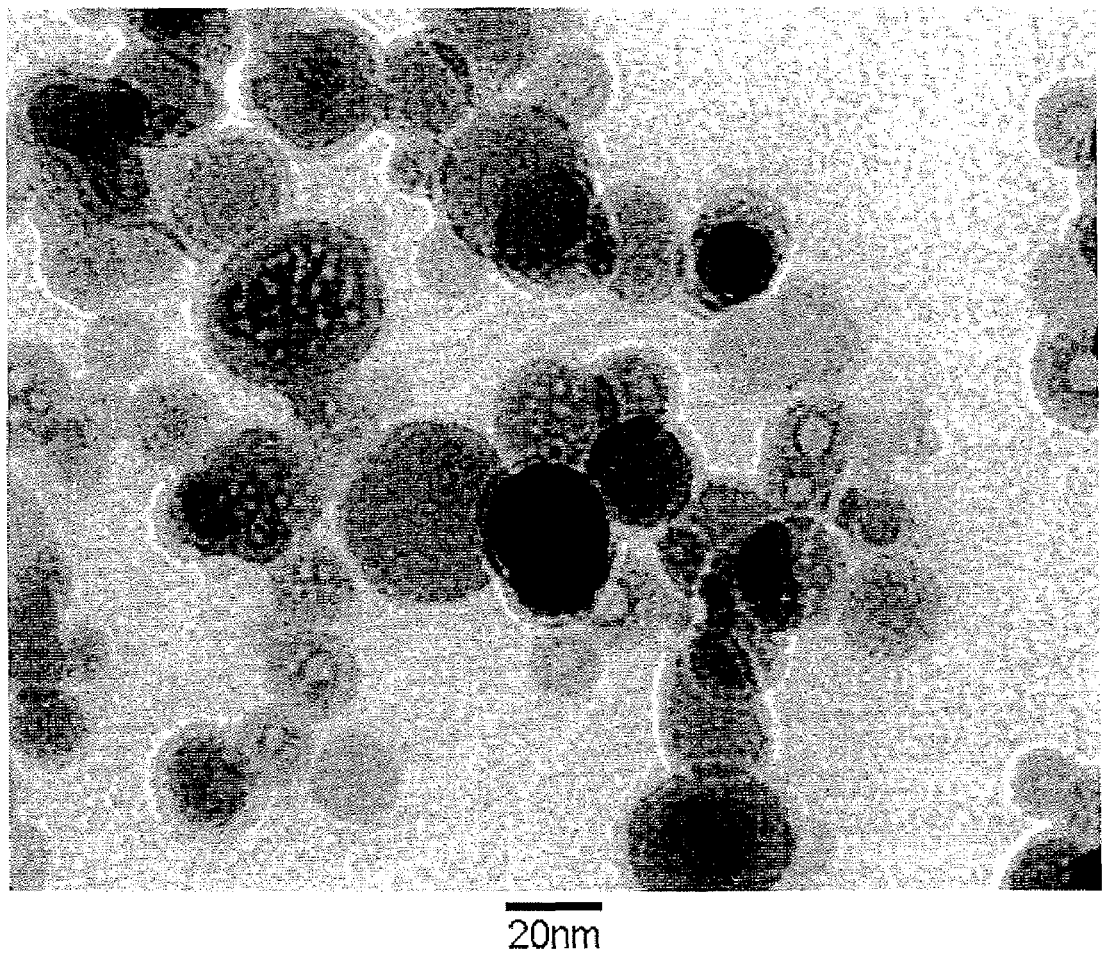
FIG. 4 shows a transmission electron microscope image of fine particles obtained in Example 1.
Figure 5:
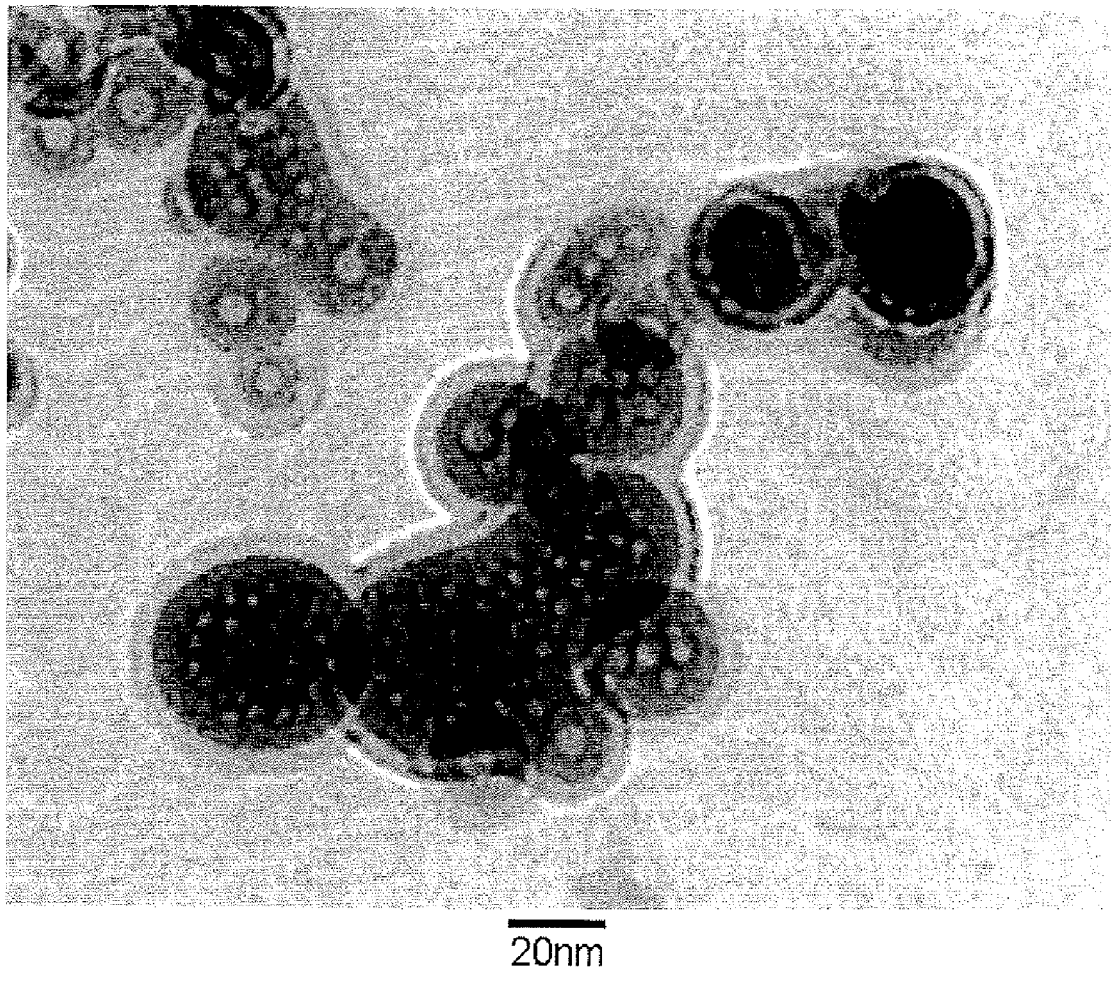
FIG. 5 shows a transmission electron microscope image of fine particles obtained in Comparative Example 1.

The TEM image of the fine particles produced in the Example 1 and the TEM image of the fine particles produced in the Comparative Example 1 are shown in FIG. 4 and FIG. 5, respectively, as representative examples.

As a result of observation with a microscope, it has been confirmed that the fine particles produced in each of the Examples and the Comparative Examples were substantially spherical in shape.

In addition, as a result of more detailed evaluation of the TEM images, it has been found that the fine particles produced in each of the Examples contained hollow particles. In all the Examples, the hollow particle content in the fine particles was in the range of 16 to 24%.

2.2 Evaluation of Particle Shape (Roundness Coefficient)

Evaluation of particle shape was made for the fine particles produced in each of the Examples and the Comparative Examples.

First, for each of the Examples and Comparative Examples, the TEN image obtained in the section 2.1 was analyzed using an image analysis software ("Particle Analysis Ver. 2.0" developed by Sumitomo Metal Technology Inc.) to determine the roundness coefficients C represented by the following formula (I) of the particles. Then, an average roundness coefficient C was calculated as the average of roundness coefficients C of 10 particles.

$$C = 4\pi S / L^2 \quad (I)$$

where $S$ (nm$^2$) represents an area of a projection image of a particle as a measuring object, and $L$ (nm) represents a circumferential length of the projection image of the particle as a measuring object.

The evaluation result of particle shape is shown in Table 1.

2.3 Evaluations of Crystallinity and Impurity Content

First, the fine particles produced in each of the Example 1 and the Comparative Example 1 were analyzed by Fourier transform infrared spectroscopy to evaluate the bonding state of atoms in the fine particles.

Figure 6:
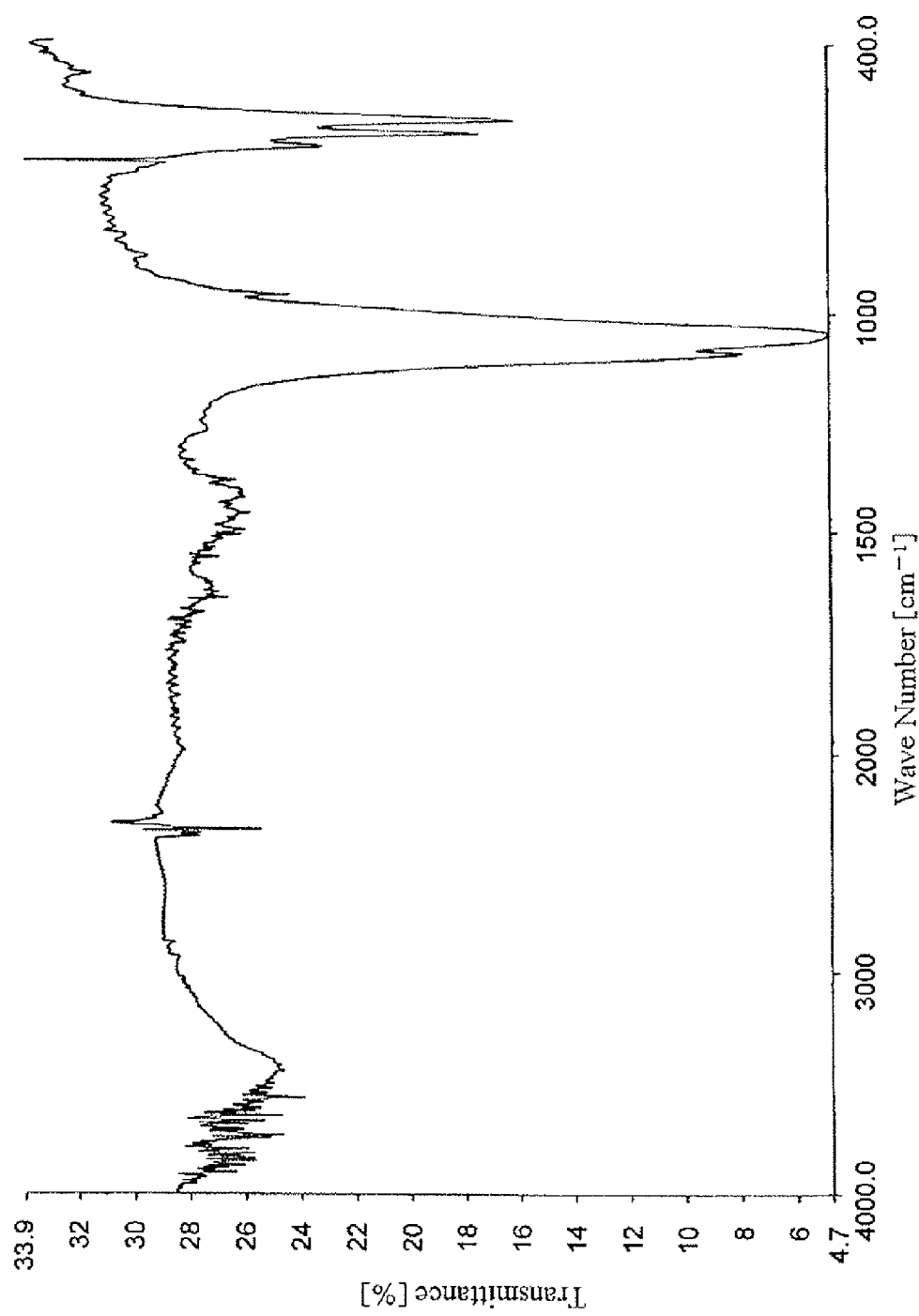
FIG. 6 shows an infrared absorption spectrum of the fine particles obtained in Example 1.
Figure 7:
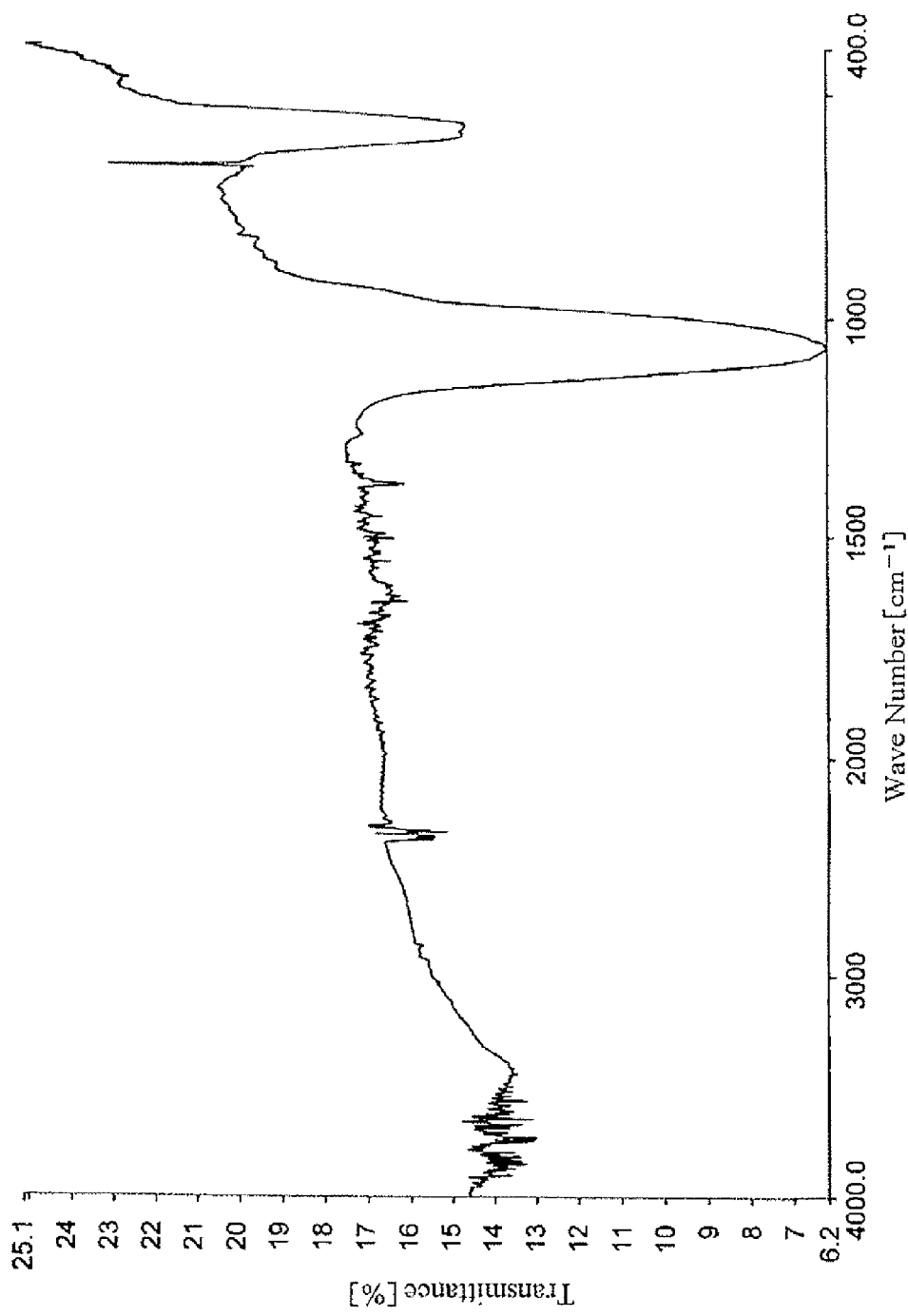
FIG. 7 shows an infrared absorption spectrum of the fine particles obtained in Comparative Example 1.

FIG. 6 shows an infrared absorption spectrum of the fine particles produced in the Example 1, and FIG. 7 shows an infrared absorption spectrum of the fine particles produced in the Comparative Example 1.

As can be seen from FIGS. 6 and 7, absorption attributable to hydroxyl groups is observed at around a wave number of 640 cm$^{-1}$ in FIG. 6, whereas such a feature is not observed in FIG. 7. This result indicates that substantially no hydroxyapatite (Ca$_{10}$(PO$_4$)$_6$(OH)$_2$) exists in the fine particles of the Comparative Example 1.

Next, the fine particles produced in each of the Examples and the Comparative Examples were subjected to X-ray diffraction analysis to evaluate the presence or absence of peaks other than peaks attributed to hydroxyapatite in their respective X-ray diffraction spectra.

Figure 8:
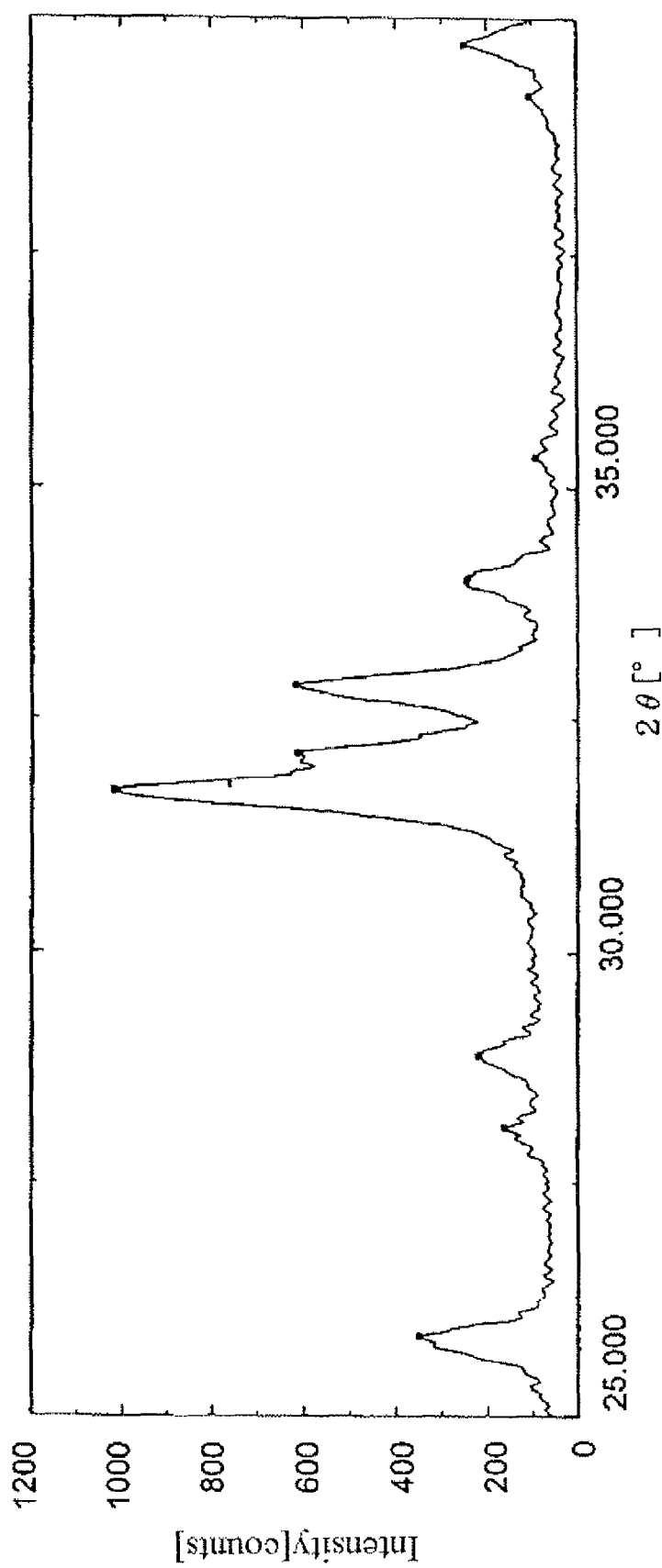
FIG. 8 shows an X-ray diffraction spectrum of the fine particles obtained in Example 1.
Figure 9:
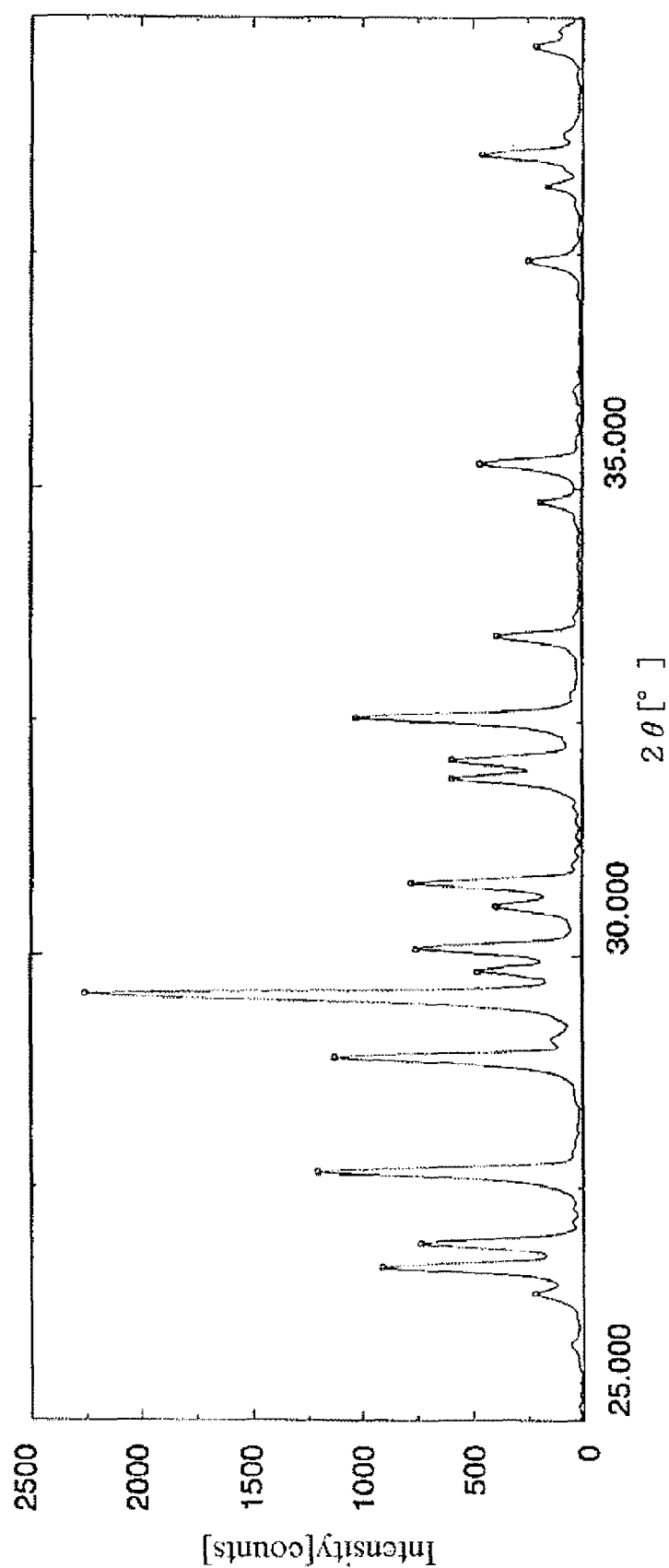
FIG. 9 shows an X-ray diffraction spectrum of fine particles obtained in Example 7.
Figure 10:
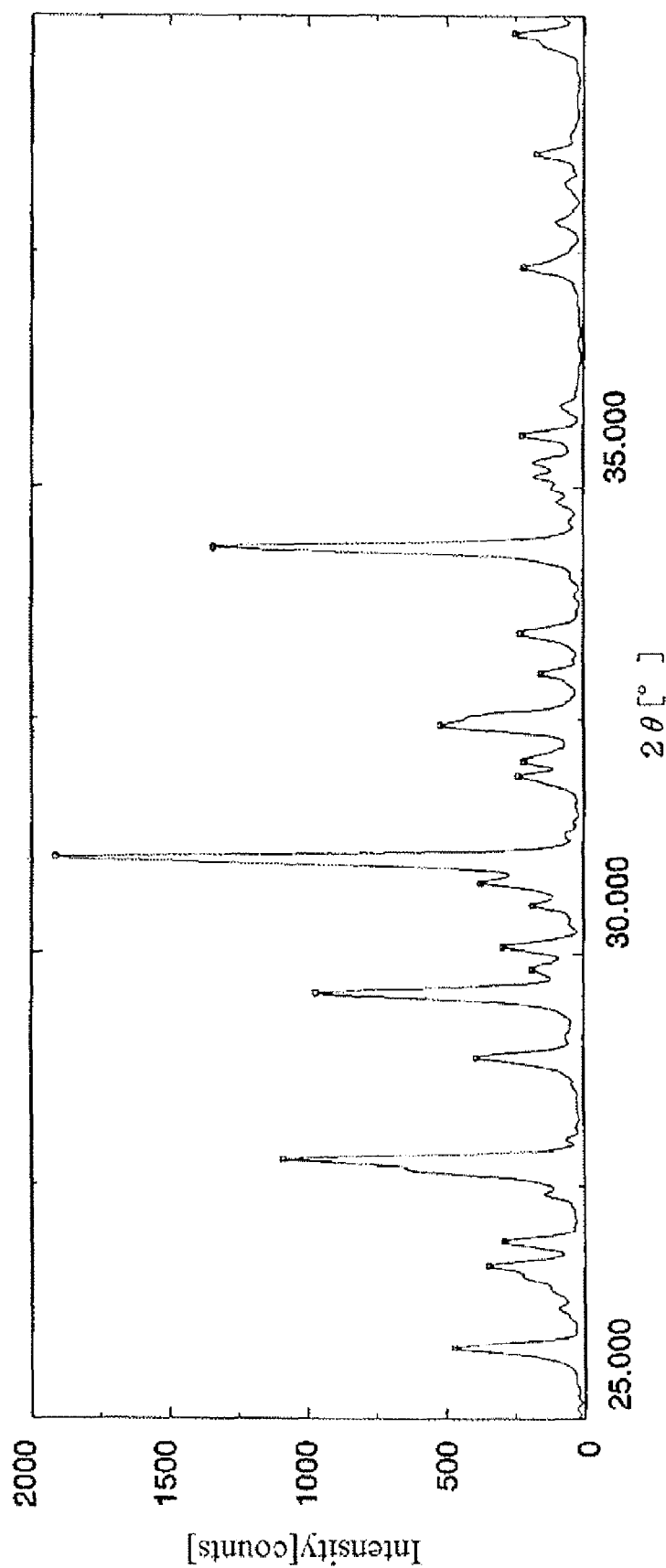
FIG. 10 shows an X-ray diffraction spectrum of fine particles obtained in Example 8.
Figure 11:
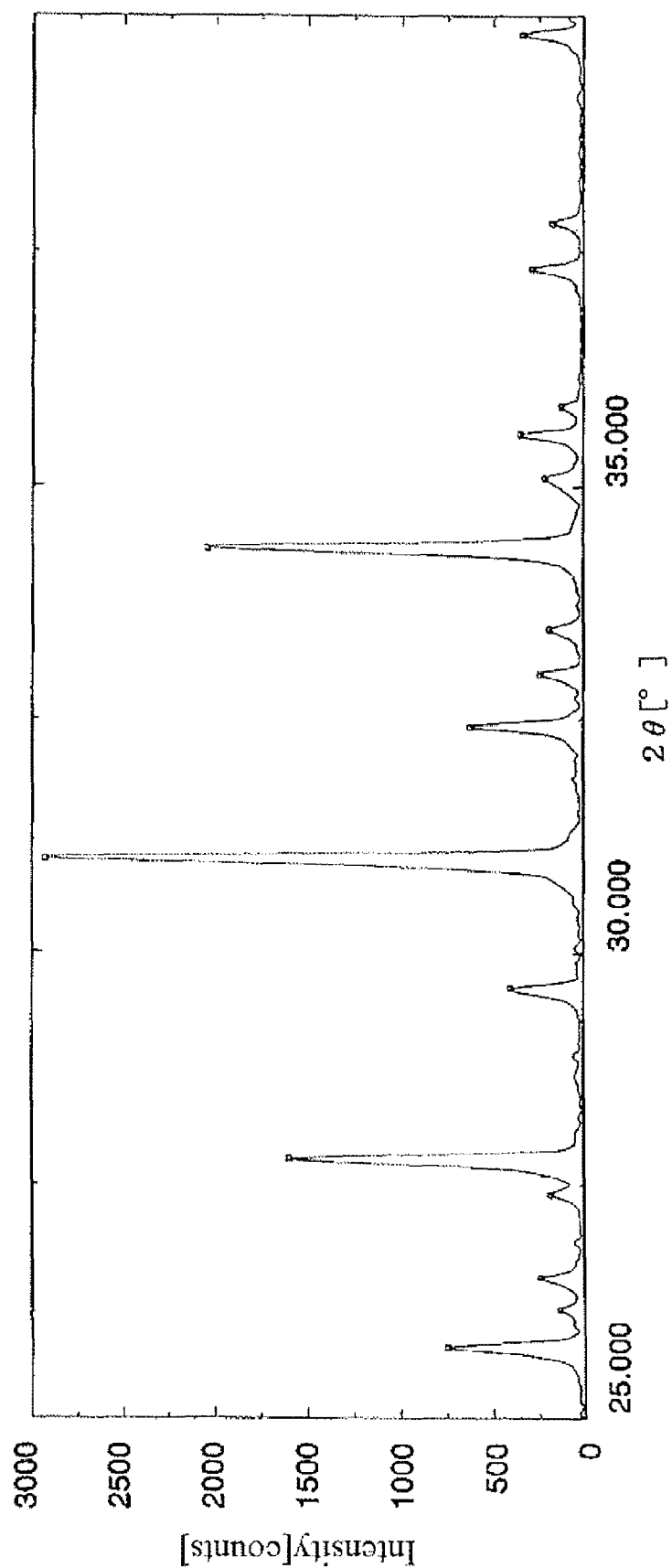
FIG. 11 shows an X-ray diffraction spectrum of fine particles obtained in Example 9.
Figure 12:
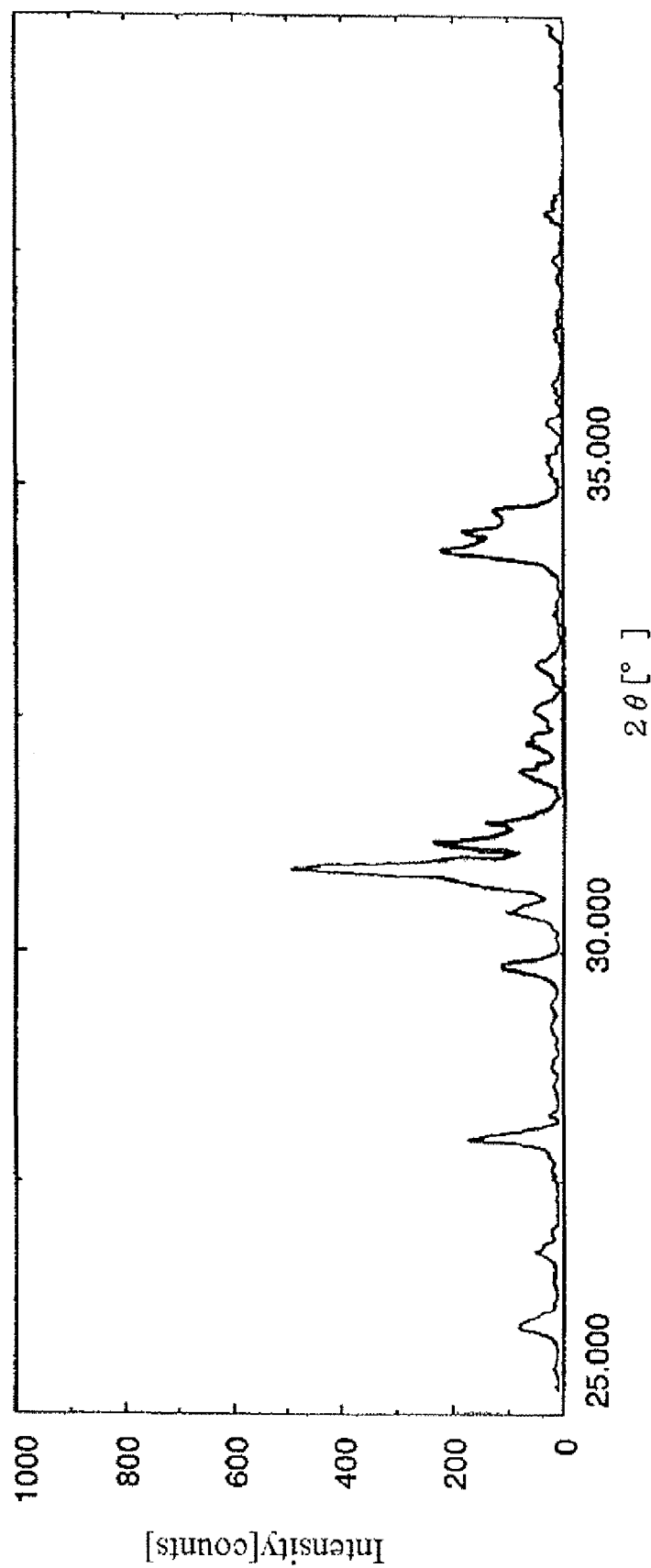
FIG. 12 shows an X-ray diffraction spectrum of fine particles obtained in Example 10.
Figure 13:
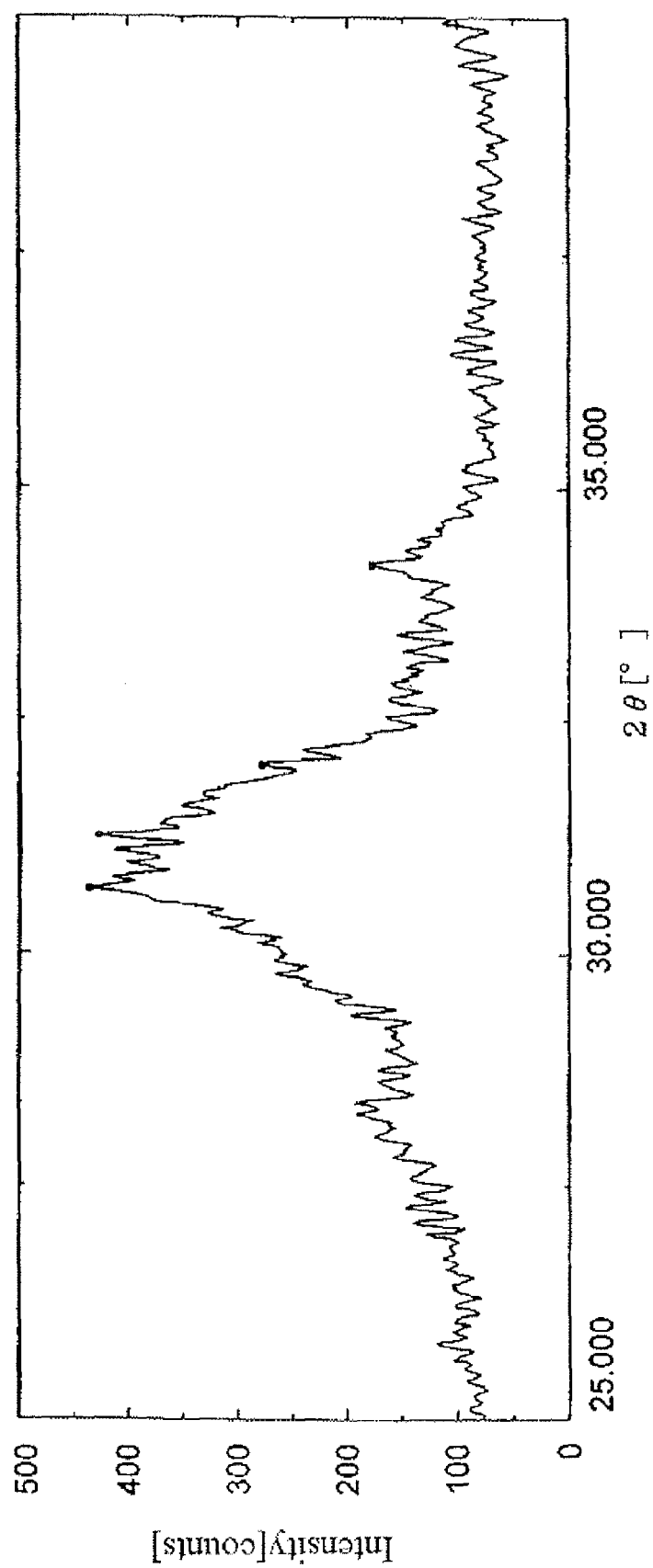
FIG. 13 shows an X-ray diffraction spectrum of the fine particles obtained in Comparative Example 1.

As representative examples, the X-ray diffraction spectrum of the fine particles produced in the Example 1 is shown in FIG. 8, the X-ray diffraction spectra of the fine particles produced in the Examples 7 to 10 are shown in FIGS. 9 to 12, respectively, and the X-ray diffraction spectrum of the fine particles produced in the Comparative Example 1 is shown in FIG. 13.

As can be seen from FIG. 8, a plurality of peaks are observed in the X-ray diffraction spectrum, and almost all of the peaks are attributed to hydroxyapatite (Ca/P ratio: 1.67). From the result, it has been confirmed that highly crystalline hydroxyapatite was produced in the Example 1.

As can be seen from FIGS. 9 to 12, a plurality of peaks are observed in each of the X-ray diffraction spectra. More specifically, the X-ray diffraction spectrum shown in FIG. 9 contains peaks attributed to a calcium phosphate-based compound with a Ca/P ratio of 1.0, the X-ray diffraction spectrum shown in FIG. 10 contains peaks attributed to a calcium phosphate-based compound with a Ca/P ratio of 1.2, the X-ray diffraction spectrum shown in FIG. 11 contains peaks attributed to a calcium phosphate-based compound with a Ca/P ratio of 1.4, and the X-ray diffraction spectrum shown in FIG. 12 contains peaks attributed to tricalcium phosphate with a Ca/P ratio of 1.5. These results indicate that crystalline calcium phosphate-based compounds with Ca/P ratios of 1.0, 1.2, 1.4, and 1.5 were produced in the Examples 7, 8, 9, and 10, respectively.

On the other hand, as can be seen from FIG. 13, clear peaks are not observed in the X-ray diffraction spectrum. From the result, it has been confirmed that the fine particles produced in the Comparative Example 1 were amorphous.

Further, quantitative analysis was carried out for each of the X-ray diffraction spectra shown in FIGS. 8 to 13 to evaluate impurity content.

In this regard, it is to be noted that high-purity hydroxyapatite, calcium oxide, and tricalcium phosphate were used as reference samples for the quantitative analysis.

The evaluation result of impurity content determined by quantitative analysis is shown in Table 1.

TABLE 1

| | Slurry | | | | | Evaluation Results | | | |
|---|---|---|---|---|---|---|---|---|---|
| | Raw Material | | | Structure of | | Structure | Average Particle | Average | |
| | First Substance | Second Substance | Ca/P Ratio | Reaction Product | Heating Method | of Fine Particles | Diameter (nm) | Roundness Coefficient C | Impurity Content (wt %) |
| Example 1 | diphosphorus pentoxide | calcium nitrate tetrahydrate | 1.67 | amorphous | plasma | crystalline | 21 | 0.93 | 0.4 |
| Example 2 | diphosphorous pentoxide | calcium ethoxide | 1.67 | amorphous | plasma | crystalline | 24 | 0.92 | 0.5 |
| Example 3 | diphosphorus pentoxide | calcium nitrate tetrahydrate + calcium ethoxide | 1.67 | amorphous | plasma | crystalline | 25 | 0.86 | 0.4 |
| Example 4 | triethyl phosphate | calcium nitrate tetrahydrate | 1.67 | amorphous | plasma | crystalline | 32 | 0.88 | 0.6 |
| Example 5 | diphosphorus pentoxide + triethyl phosphate | calcium nitrate tetrahydrate | 1.67 | amorphous | plasma | crystalline | 29 | 0.88 | 0.7 |
| Example 6 | diphosphorus pentoxide | calcium nitrate tetrahydrate | 1.67 | amorphous | electric heater | crystalline | 53 | 0.85 | 1.2 |
| Example 7 | diphosphorus pentoxide | calcium nitrate tetrahydrate | 1.0 | amorphous | plasma | crystalline | 25 | 0.89 | 0.6 |
| Example 8 | diphosphorus pentoxide | calcium nitrate tetrahydrate | 1.2 | amorphous | plasma | crystalline | 31 | 0.87 | 0.9 |
| Example 9 | diphosphorus pentoxide | calcium nitrate tetrahydrate | 1.4 | amorphous | plasma | crystalline | 28 | 0.91 | 0.4 |
| Example 10 | diphosphorus pentoxide | calcium nitrate tetrahydrate | 1.5 | amorphous | plasma | crystalline | 26 | 0.90 | 0.4 |
| Comp. Ex. 1 | calcium hydroxide | phophoric acid | 1.67 | crystalline | plasma | amorphous | 61 | 0.79 | — |
| Comp. Ex. 2 | calcium hydroxide | phophoric acid | 1.67 | crystalline | electric heater | amorphous | 231 | 0.75 | — |

As can be seen from Table 1, the fine particles produced in each of the Examples were very fine particles having an average particle diameter of less than 100 nm.

On the other hand, the average particle diameter of the fine particles produced in the Comparative Example 1 was less than 100 nm, whereas the average particle diameter of the fine particles produced in the Comparative Example 2 was larger than 200 nm.

Further, the average roundness coefficient C of the fine particles produced in each of the Examples was 0.85 or more. From the result, it has been confirmed that the projection images of the fine particles produced in each of the Examples were very close to perfect circles, that is, the fine particles produced in each of the Examples were very close to perfect spheres in shape.

On the other hand, the average roundness coefficient C of the fine particles produced in each of the Comparative Examples was less than 0.8. From the result, it has been confirmed that the fine particles produced in each of the Comparative Examples were very far from perfect spheres in shape.

Furthermore, as a result of the analysis of the X-ray diffraction spectra shown in FIGS. 8 to 12, it has been found that the impurity content in the fine particles produced in each of the Examples 1 and 7 to 10 was very low, and the fine particles produced in the Examples 1 and 7 to 10 were composed of high-purity hydroxyapatite.

On the other hand, quantitative analysis could not be carried out for the X-ray diffraction spectrum shown in FIG. 13 because it contained no clear peaks.

EFFECT OF THE INVENTION

According to the present invention, it is possible to efficiently produce fine particles (especially, spherical particles) of a crystalline calcium phosphate-based compound at low cost.

Further, the amorphous reaction product contained in the slurry is uniformly crystallized (that is, the amorphous reaction product is uniformly changed to a crystalline calcium phosphate-based compound) so that the occurrence of variations in crystal growth rate is suppressed, thereby enabling the production of crystal grains substantially uniform in grain size. As a result, particles having high density and high strength are obtained.

Furthermore, it is possible to efficiently carry out crystallization of the reaction product in a short period of time, thereby enabling a larger amount of the slurry to be treated per unit time. As a result, the yield of particles is improved, and therefore the producing cost of particles is reduced.

Finally, it is also to be understood that the present disclosure relates to subject matters contained in Japanese Patent Application No. 2005-230320 (filed on Aug. 9, 2005) and Japanese Patent Application No. 2005-266628 (filed on Sep. 14, 2005) which are expressly incorporated herein by reference in its entirety.

What is claimed is:

1. A method for producing particles, comprising:
    mixing a first substance containing at least either one phosphorus oxide selected from the group consisting of phosphorus suboxide, diphosphorus trioxide, diphosphorus tetroxide, and diphosphorus pentoxide, or triethyl phosphate and a second substance containing calcium in a solvent to react the first substance with the second substance to thereby obtain a slurry in a gelled liquid state;

feeding droplets of the slurry containing an amorphous reaction product obtained from a reaction between the first substance and the second substance in a heated atmosphere to bring the amorphous reaction product into a gaseous state; and crystallizing the amorphous reaction product in the gaseous state to obtain particles mainly composed of a calcium phosphate-based compound.

2. The method for producing particles as claimed in claim 1, wherein the second substance contains as a main ingredient, at least either calcium alkoxide or calcium salt.

3. The method for producing particles as claimed in claim 1, wherein the amount of impurities contained in the calcium phosphate-based compound is 5 wt % or less.

4. The method for producing particles as claimed in claim 3, wherein the impurities mainly contain at least either a by-product other than the reaction product or a decomposition product of the calcium phosphate-based compound.

5. The method for producing particles as claimed in claim 1, wherein the heated atmosphere contains plasma produced by ionization of an ambient gas.

6. The method for producing particles as claimed in claim 5, wherein the temperature of the plasma is in the range of 2,000 to 15,000° C.

7. The method for producing particles as claimed in claim 1, wherein the crystallizing step further comprises the step of forcibly cooling the reaction product in the gaseous state.

8. The method for producing particles as claimed in claim 1, wherein the particles are substantially spherical in shape.

9. The method for producing particles as claimed in claim 8, wherein the average particle diameter of the spherical particles is in the range of 5 to 300 nm.

10. The method for producing particles as claimed in claim 1, wherein the calcium phosphate-based compound is hydroxyapatite or tricalcium phosphate.

11. Particles produced by the method for producing particles as claimed in claim 1.

12. The particles as claimed in claim 11, which contain hollow particles in the proportion of 5 to 40%.

13. A sintered body obtained by sintering a molded body of the particles as claimed in claim 11.

14. The method according to claim 1, wherein the second substance contains calcium nitrate tetrahydrate.

15. The method according to claim 1, wherein the solvent contains at least one alcohol selected from the group consisting of methanol, ethanol, propanol, and butanol.

* * * * *